W. S. Kirkham,

Lock,

No. 1,390, Reissued Jan. 27, 1863

Witnesses.
J. W. Coombs
R. S. Spencer

Inventor
W. S. Kirkham
per Munn & Co
Attorneys

UNITED STATES PATENT OFFICE.

CHARLES A. MILLER, OF PHILADELPHIA, PENNSYLVANIA, ASSIGNEE OF W. S. KIRKHAM, OF BRANFORD, CONNECTICUT.

IMPROVEMENT IN LOCKS AND LATCHES.

Specification forming part of Letters Patent No. 32,521, dated June 11, 1861; Reissue No. 1,390, dated January 27, 1863.

*To all whom it may concern:*

Be it known that I, CHARLES A. MILLER, of the city of Philadelphia, and State of Pennsylvania, have, by deed of assignment, duly recorded in the United States Patent Office, become the owner of certain Letters Patent for Improvements in Locks and Knob-Latches, granted to the late W. S. KIRKHAM, on the 11th day of June, A. D. 1861, which Letters Patent I deem invalid and insufficient by reason of a defective specification; and I do hereby declare the following to be a full, clear, and exact description of the said invention, reference being had to the accompanying drawings, and to the letters of reference marked thereon.

This invention relates to certain improvements in door-locks; and the improvements consist, first, in so dividing the hub or follower and so combining the same with a reversible latch that the arms or their equivalents of the divided hub or follower may be released for the purpose of allowing the latch to be reversed or turned; second, so constructing and arranging the individual parts of a divided hub or follower that the reversal or turning of the latch is prevented only by the presence of the spindle within the lock.

The object of the invention is to render the lock readily applicable to either right or left hand doors.

In order to enable others skilled in the art to make and use the said invention, I will now proceed to describe its peculiar construction and operation.

Figure 1:
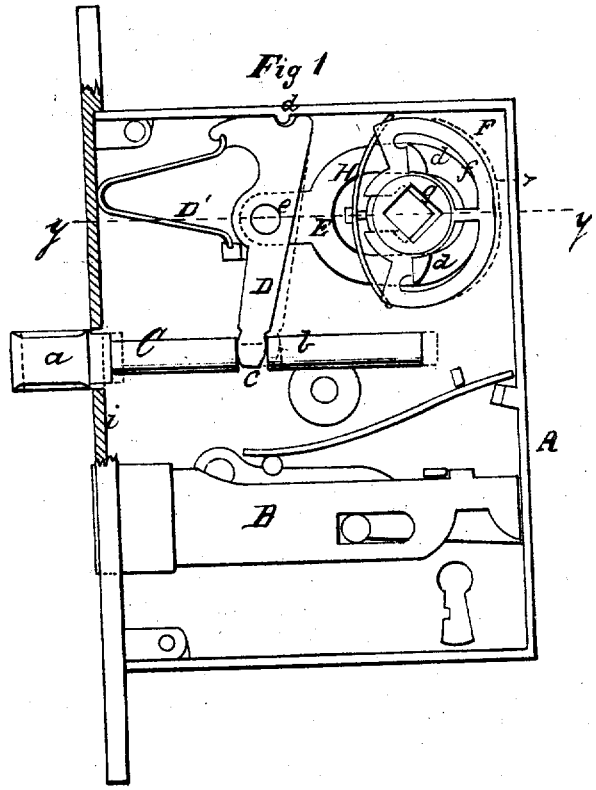
Figure 3:
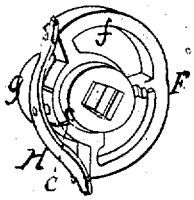
Figure 2:
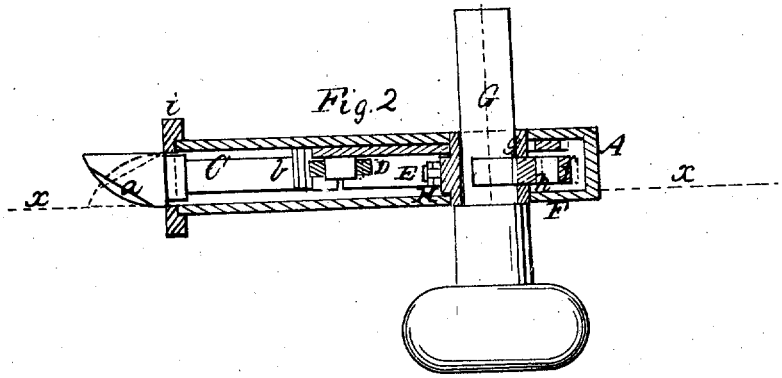

On reference to the accompanying drawings, which form a part of this specification, Figure 1 is a face view of the lock with the front plate removed, in order to exhibit the interior. Fig. 2 is a sectional plan view on the line *y y*, Fig. 1, and Fig. 3 a detached perspective view of the hub or follower through which the square knob-spindle passes.

Similar letters refer to similar parts throughout the several views.

A represents the case of the lock, which in the present instance is of the class known as "mortise-locks"—that is, locks let into the edge of the door, and consequently concealed from view. It should be understood, however, that the invention which I am about to describe can be applied to such locks as are secured to the outer surface of doors. In fact, the invention is applicable to door-locks generally. B is the bolt, to be operated by the key of the lock. As this bolt forms no part of the invention, and as it is similar in construction and operation to the bolts of other locks, a minute description will be unnecessary. The latch C, which is operated by the turning of the knob-spindle, is of peculiar construction, the portion *a*, which I term the "head," and which projects beyond the face plate *i* of the lock, is square and beveled or rounded off at one end, as best observed on reference to Fig. 2. The stem *b* of the latch is cylindrical, as is also the portion *x* adjacent to the head *a*. The square portion of the latch, as long as the lock remains in working order, is arranged to fit snugly but to slide freely in a square opening in the said face-plate *i*, and the latch cannot be turned or its beveled end *a* reversed until it is pulled so far forward that the cylindrical portion *x* takes its place in the said square opening of the face-plate *i*, when the latch can be readily turned and its beveled edge reversed. This reversal, however, is only permitted under the circumstances fully described hereinafter. At or near the center of the cylindrical portion *b* of the latch is a recess, *c*, in which fits the lower end of the lever D, the latter having its fulcrum on a lug, *d'*, which projects from the inside of the upper edge of the case, a spring, D', bearing against the short arm of the lever. A slide, E, is connected by a pin, *e*, to the lever D, and on this slide are two projections or lugs, *d d*, against which the arms of the hub or follower bear. This hub or follower is of peculiar construction. It consists of two parts, *f* and *g*, as best observed in the perspective view, Fig. 3. The part *g* is arranged to turn in both faces of the lock, as seen in Fig. 2, and has a square opening for the reception of the knob-spindle G. The part *g*, however, of the hub is partly cut away for the reception of the part *f*, a portion of which is also adapted to the knob-spindle. It is this portion *f* of the hub which acts on the projections *d d* of the slide. The points which bear against the projections I term the "arms" of the hub.

In the absence of the spindle from the hub the portion *f* can be slid forward in the direction of the arrow independently of the portion

*g*, which remains stationary, inasmuch as it is confined to both the front and the rear plate of the lock-case. When the spindle is inserted nto the hub, however, the two portions of the same become as one, and perform the same functions as an ordinary hub—that is, one or other of the arms acts on one of the projections *d* on turning the spindle, and causes the slide to operate the latch. On withdrawing the spindle, however, the portion *f* of the hub is released from the portion *g*, and consequently the arms of the portion *f* are released as far as their action on the projections *d d* is concerned. When it is desirable to reverse the latch, therefore, the first thing to be done is to withdraw the knob-spindle, after which the latch can be pulled out from the face-plate *i* to a distance which the presence of the spindle in the hub had hitherto prevented. On thus pulling the latch out the lever and slide must move in the same direction, and this movement is permitted by the yielding of the arms of the hub, which have been released on withdrawing the spindle. After the latch has been drawn out so far that the cylindrical portion *x* takes the place previously occupied by the head *a* in the square opening of the face-plate *i*, the latch can be readily turned and reversed, pushed back to its proper position, and the spindle reinserted.

It will be observed that a spring, H, is secured to the portion *g* of the hub, and that it bears against the portion *d*. The only object of this spring is to restore the said portion *f* to its proper position in relation to the position *g* after the former has been released, for the purpose described above.

It will now be seen without further description that by the peculiar construction of the hub the arms of the same may be released, the reversal of the latch promptly accomplished, that the presence of the spindle in the hub effectually prevents any reversal of the latch, and consequently that the lock can be readily rendered applicable to a right or left hand door.

It will be evident to those familiar with locks of this class that other devices may be substituted for the lever D and slide E as a connection between the hub and latch, and that the hub itself may consist of parts constructed and arranged in a manner differing from that described.

I therefore claim as the invention of the aforesaid W. S. KIRKHAM—

1. So dividing the hub or follower and so combining the same with a reversible latch that the arms or their equivalents of the divided hub or follower may be released for the purpose of allowing the latch to be reversed or turned.

2. So constructing and arranging the individual parts of a divided hub or follower that the reversal or turning of the latch is prevented only by the presence of the spindle within the lock.

In testimony whereof I have signed my name to this specification before two subscribing witnesses.

CHARLES A. MILLER.

Witnesses:
J. P. ANCKER,
WILLIAM DELANY.